(12) United States Patent
Wehrs et al.

(10) Patent No.: US 12,087,567 B2
(45) Date of Patent: Sep. 10, 2024

(54) ION GUIDE WITH REDUCED NODING EFFECT

(71) Applicant: Thermo Fisher Scientific (Bremen) GmbH, Bremen (DE)

(72) Inventors: Henning Wehrs, Bremen (DE); Johannes Schwieters, Ganderkesee (DE); Gerhard Jung, Delmenhorst (DE)

(73) Assignee: THERMO FISHER SCIENTIFIC (BREMEN) GMBH, Bremen (DE)

( * ) Notice: Subject to any disclaimer, the term of this patent is extended or adjusted under 35 U.S.C. 154(b) by 0 days.

(21) Appl. No.: 18/339,510

(22) Filed: Jun. 22, 2023

(65) Prior Publication Data

US 2023/0343571 A1 Oct. 26, 2023

Related U.S. Application Data

(63) Continuation of application No. 17/612,502, filed as application No. PCT/EP2020/064005 on May 19, 2020, now Pat. No. 11,728,155.

(30) Foreign Application Priority Data

May 21, 2019 (GB) .................................... 1907171

(51) Int. Cl.
*H01J 49/06* (2006.01)
*F16K 1/20* (2006.01)
(Continued)

(52) U.S. Cl.
CPC .......... *H01J 49/063* (2013.01); *F16K 1/2007* (2013.01); *H01J 49/005* (2013.01);
(Continued)

(58) Field of Classification Search
CPC ...... H01J 49/005; H01J 49/063; H01J 49/077; H01J 49/065; H01J 49/067; H01J 49/068; H01J 49/421; H01J 49/4215
See application file for complete search history.

(56) References Cited

U.S. PATENT DOCUMENTS 2,939,952 A 6/1960 Wolfgang et al.
5,941,501 A 8/1999 Biegelsen et al.
(Continued)

FOREIGN PATENT DOCUMENTS

JP S62118133 U 7/1987

OTHER PUBLICATIONS

PCT/EP2020/064004, International Search Report and Written Opinion, Oct. 13, 2020, 20 pages.
(Continued)

*Primary Examiner* — David E Smith (57) ABSTRACT

An ion optical arrangement (1) for use in a mass spectrometer comprises electrodes (11, 12, 14) comprising a multipole arrangement defining an ion optical axis, and a voltage source for providing voltages to the electrodes to produce electric fields. The ion optical arrangement is configured for producing a radio frequency electric focusing field for focusing ions on the ion optical axis. The radio frequency electric focusing field has a varying frequency so as to reduce any mass dependence of ion trajectories through the ion optical arrangement. The ion optical arrangement may further be configured for producing a static electric field in response to a DC bias voltage applied to the multipole arrangement. A superimposed varying electric field may be produced by superimposing an AC voltage upon the DC bias voltage.

12 Claims, 5 Drawing Sheets

(51) Int. Cl.
*H01J 49/00* (2006.01)
*H01J 49/02* (2006.01)
*H01J 49/10* (2006.01)
*H01J 49/42* (2006.01)

(52) U.S. Cl.
CPC ........ *H01J 49/0077* (2013.01); *H01J 49/022* (2013.01); *H01J 49/065* (2013.01); *H01J 49/067* (2013.01); *H01J 49/068* (2013.01); *H01J 49/105* (2013.01); *H01J 49/421* (2013.01); *H01J 49/4215* (2013.01)

(56) References Cited

U.S. PATENT DOCUMENTS

| | | |
|---|---|---|
| 6,140,638 A | 10/2000 | Tanner et al. |
| 6,323,482 B1 | 11/2001 | Clemmer et al. |
| 6,534,764 B1 | 3/2003 | Verentchikov et al. |
| 8,890,058 B2 | 11/2014 | Takeuchi et al. |
| 2003/0234376 A1 | 12/2003 | Cabuz et al. |
| 2011/0012017 A1* | 1/2011 | Nishiguchi ........... H01J 49/063 250/281 |
| 2015/0102215 A1* | 4/2015 | Jung .................. H01J 49/0027 250/282 |
| 2016/0027633 A1 | 1/2016 | Jung et al. |
| 2016/0181084 A1 | 6/2016 | Smith |
| 2018/0102239 A1 | 4/2018 | Schoen et al. |
| 2018/0286659 A1 | 10/2018 | Guna |

OTHER PUBLICATIONS

PCT/EP2020/064005, International Search Report and Written Opinion, Aug. 24, 2020, 17 pages.
PCT/EP2020/064007, International Search Report and Written Opinion, Oct. 9, 2020, 23 pages.
Shikida M et al., "Electrostatically Driven Gas Valve with High Conductance", Journal Of Microelectromechanical Systems, IEEE Service Center, vol. 3, No. 2, Jun. 1, 1994 (Jun. 1, 1994), pp. 76-79, XP000459055, ISSN: 1057-7157, DOI: 10.1109/84.294324.

* cited by examiner

ION GUIDE WITH REDUCED NODING EFFECT

RELATED APPLICATIONS

This Application is a Continuation application of U.S. patent application Ser. No. 17/612,502, filed on Nov. 18, 2021. U.S. patent application Ser. No. 17/612,502 is a U.S. National Application filed under 35 U.S.C. § 371 of the International Application Number PCT/EP2020/064005, filed on May 19, 2020. PCT Application Number PCT/EP2020/064005 claims priority to the benefit of GB Patent Application 1907171.1, filed May 21, 2019. The entire contents of each of the aforementioned applications are incorporated herein by reference.

FIELD OF THE INVENTION

The present invention relates to isotope ratio mass spectrometry (MS). In particular, the present invention relates to interference free, high resolution, multi-collector isotope ratio mass spectrometry and elemental analysis, for example in combination with a collision cell and a plasma source, such as an inductively coupled plasma (ICP) source. More in particular, the present invention relates to an ion guide with a reduce noding effect.

BACKGROUND OF THE INVENTION

Multi-collector ICP-MS is an established method for high precision and accurate isotope ratio analysis. Applications are in the field of geochronology, geochemistry, cosmochemistry, biogeochemistry, environmental sciences as well as in life sciences. Precise and accurate isotope ratio measurements very often provide the only information to gain deeper insight into scientific questions which cannot be answered by any other analytical technique. However, elemental and molecular interferences in the mass spectrometer limit the attainable precision and accuracy of the analysis.

These interferences are present in the sample material itself or are generated by sample preparation from a contamination source (used chemicals, cleanliness of sample container, and fractionation during sample purification) or are even generated in the ion source or in the mass spectrometer. The problems with such interferences can be countered by:
1. using a high mass resolution mass analyzer that discriminates against interferences by detecting small differences in mass of the interference relative to the sample ion;
2. by sample preparation and chemical separation of interference prior to mass analysis; and/or
3. by using a collision cell integrated into the mass analyzer.

In a collision cell the chemical interferences are removed by chemical reactions, and/or by kinetic energy discrimination, taking advantage of different cross sections of molecular and elemental species inside the pressurized collision cell which results in different kinetic energy losses of molecular and elemental ions. By means of a high pass energy filter following the collision cell the lower energy molecular species can be discriminated.

A collision cell is an encapsulated volume within the ion optical beam path which is pressurized with a collision gas to cause interactions (i.e. collisions and/or chemical reactions) between the ions and the gas molecules). In order to generate efficient collisions and chemical reactions inside the collision cell, the ions preferably are at a low ion beam energy of a few electronvolt (eV) only. The collision cell usually is a multipole ion guide which is powered by RF fields to guide the ions through the collision cell. In order to achieve a reasonable gas pressure, the multipole ion guide is encapsulated in a compact volume with small entrance and entrance apertures, typically in the range of 1-3 mm diameter. A collision cell coupled to a multi-collector mass spectrometer is disclosed in British patent application GB 2 546 060 (Thermo Fisher Scientific (Bremen) & The University of Bristol).

Ions having different masses but the same energy travel at different velocities through the time dependent oscillating field of the collision cell and as a result the ion trajectories are mass dependent. In other words, the trajectories depend on the mass of the ions traveling through the RF field. This effect is called "noding". This can in particular pose a problem at the exit of the multipole structure, where ions of different masses may exit at different angles.

The mass dependence of the collision cell transmission can be a problem for accurate isotope ratio measurements, even when it is small. However, for some analytical applications there is no other choice to remove isobar interferences but to use the collision cell.

For samples where no interferences are present it would be advantageous to avoid the low energy passage of the ions through the radio frequency (RF) multipole collision cell optics and to exclude any uncertainty of the discrimination effects caused in the collision cell (i.e. chemical effects as well as the noding effect).

It is noted that the undesired "noding effect" is not limited to collision cells but may also occur in other ion optical arrangements, such as mass filters.

One way to solve this problem is to install a second beam path in the mass spectrometer where the ion beam is deflected off axis prior to the collision cell to bypass the collision cell and finally to deflect the ions back onto the optical axis of the mass spectrometer. Such a dual path ion optics arrangement is described in British patent application GB 2 535 754 (Nu Instruments). It allows to switch between the low energy collision cell beam path and an off axis static high energy beam path. This results into a rather complicated setup with several ion beam deflectors causing image aberrations and alignment problems.

SUMMARY OF THE INVENTION

It is an object of the present invention to provide an ion optical arrangement, such as a collision cell or a mass filter, for a mass spectrometer which can largely avoid the noding problems related to existing RF driven ion optics and which is simpler and more compact than the dual path arrangement of the prior art.

Accordingly, the present invention provides an ion optical arrangement for use in a mass spectrometer comprising:
  electrodes comprising a multipole arrangement defining an ion optical axis, and
  a voltage source for providing voltages to the electrodes to produce electric fields,
wherein the ion optical arrangement is configured for producing a radio frequency electric focusing field for focusing ions on the ion optical axis, and
wherein the radio frequency electric focusing field has a varying frequency so as to reduce any mass dependence of ion trajectories through the ion optical arrangement.

By providing an ion optical arrangement or ion guide which has a varying radio frequency (RF) electric field, in contrast to an RF electric field having a constant frequency, the noding effect and hence the mass dependency of the ion trajectories through the ion optical arrangement is mitigated and may in some instances be completely eliminated. Varying the RF frequency changes the number of oscillations of the ion trajectory in the ion optical arrangement. In particular a cyclically varying frequency is useful in mitigating the noding effect. The varying RF frequency is therefore preferably a cyclically varying frequency.

The cyclical variation in the RF frequency is not limited to a sinusoidal variation but may also comprise a saw-tooth shaped variation in which the frequency may linearly increase (or decrease) from a first value to a second value, and then virtually instantaneously returns to the original value. Other frequency variations can also be envisaged, such as square wave variations.

The frequency variations are preferably effected by variations in the voltages supplied to the RF electrodes. When the ion optical arrangement comprises a multipole arrangement, therefore, the voltage source may be configured for supplying a voltage having a varying frequency to the multipole arrangement so as to produce the radio frequency electric focusing field having a varying frequency. The multipole arrangement comprises at least four poles, preferably at least six poles. It has been found that using a greater number of poles further reduces the noding effect. Accordingly, an octupole arrangement may also be advantageously used.

It is preferred that the varying frequency varies by at least 10%, preferably at least 20%. As will later be explained in more detail, it has been found that the noding effect can be effectively reduced or even eliminated by varying the number of oscillations of the ion trajectory within the ion optical arrangement. The number of oscillations can be changed from, for example, 10 to a range of 9 to 11. By periodically changing the number of oscillations within this range, the mass dependencies of the ion trajectories can be effectively reduced. To achieve a range from 9 to 11 oscillations, as in this example, a frequency range of $f_0 \pm 10\%$ is preferred, where $f_0$ is the base RF frequency. The base frequency is therefore, preferably cyclically, varied from $f_0-10\%$ to $f_0+10\%$, resulting in a frequency range of 20% of $f_0$. If a greater change in the number of oscillations is desired, a greater frequency swing will be required. For example, when the original number of oscillations in the ion trajectories is 10, as in the example above, a range from 8 to 12 oscillations may be achieved by using a frequency range of $f_0-20\%$ to $f_0+20\%$.

It is noted that this advantageous change in the number of trajectory oscillations can not only be achieved by varying the RF frequency, but also by imposing a frequency upon a static electric field. Accordingly, the present invention also provides an ion optical arrangement for use in a mass spectrometer comprising:

electrodes comprising a multipole arrangement defining an ion optical axis, and
a voltage source for providing voltages to the electrodes to produce electric fields
wherein the ion optical arrangement is configured for producing a radio frequency electric focusing field for focusing ions on the ion optical axis, wherein the ion optical arrangement is further configured for producing a static electric field, and wherein a varying electric field is superimposed upon the static electric field so as to reduce any mass dependence of ion trajectories through the ion optical arrangement.

By superimposing a varying electric field upon the static electric field, a similar reduction of the noding effect may be achieved as with varying the RF frequency. It is noted that in some embodiments a combination of measures may be used, thus combining a varying RF field with a varying field imposed upon the static field. By varying both the RF electric field and the static electric field, a further reduction of the noding effect may be achieved.

The static electric field may comprise a field produced by a DC bias voltage applied to the multipole arrangement, the superimposed varying electric field being produced by superimposing an AC voltage upon the DC bias voltage. It is noted that the DC bias voltage may be positive or negative. In some embodiments, the DC bias voltage may be equal to zero. If the DC bias voltage is originally non-zero, the superimposed AC (alternating current) voltage will typically not turn the DC bias voltage in an AC bias voltage but in a DC bias voltage having a varying amplitude, preferably a cyclically varying amplitude.

The static electric field may comprise an axial DC field produced by a DC auxiliary voltage applied to auxiliary electrodes arranged in parallel with the multipole, the superimposed varying electric field being produced by superimposing an AC voltage upon the DC auxiliary voltage. Such auxiliary electrodes may comprise so-called vanes which may be arranged in the spacings between the poles of a multipole arrangement. Such vanes are typically flat, elongate electrodes and may serve to produce an auxiliary electric field, such as an axial drag field. For such purposes, at least one auxiliary electrode may comprise a series arrangement of resistors for providing a voltage gradient in the auxiliary electrode so as to produce an axial field gradient.

Other auxiliary electrodes may comprise ion lenses consisting of a single electrode, such as an entrance electrode or an exit electrode, or a set of electrodes which together influence the ion beam. Instead of, or in addition to varying the frequency of the electric field, it is possible to vary the energy and/or velocity of the ions. Thus, the electric fields which are related to the energy and velocity of the ions may also be varied so as to counter the noding effect.

In the embodiments discussed above, RF electrodes, such as a multipole arrangement, are present. The invention is however not limited to ion optical arrangements having a multipole arrangement and embodiments can be envisaged in which no multipole arrangement is present. The present invention therefore also provides an ion optical arrangement for use in a mass spectrometer comprising:

electrodes defining an ion optical axis, and
a voltage source for providing voltages to the electrodes to produce electric fields,
wherein the ion optical arrangement is configured for producing a static electric field, and
wherein a varying electric field is superimposed upon the static electric field so as to reduce any mass dependence of ion trajectories through the ion optical arrangement.

By superimposing a varying electric field upon the static electric field, the same or similar advantages may be obtained. Embodiments of the present invention may therefore be summarized as an ion optical arrangement for use in a mass spectrometer which is configured for varying the number of oscillations of the ion trajectory within the ion optical arrangement.

In embodiments without an RF field, the static electric field may comprise an axial electric field, preferably an axial electric field having an axial field gradient. The static electric field may comprise a field produced by a DC bias voltage applied to an ion optical lens.

As mentioned above, the present invention is not limited to a collision cell or a collision/reaction cell, but also provides other ion optical arrangements. The ion optical arrangement according to the invention may therefore comprise a mass filter.

The present invention also provides a mass spectrometer comprising an ion optical arrangement as discussed above. The mass spectrometer of the invention may further comprise at least one ion source, such as an inductively coupled plasma ion source, and at least one detector arrangement, such as a multi-collector detector arrangement, and preferably also a mass filter.

The present invention additionally provides a method of operating an ion optical arrangement for use in a mass spectrometer, the ion optical arrangement comprising:
  electrodes comprising a multipole arrangement defining an ion optical axis, and
  a voltage source for providing voltages to the electrodes to produce electric fields, wherein the ion optical arrangement is configured for producing a radio frequency electric focusing field for focusing ions on the ion optical axis, the method comprising varying the frequency of the radio frequency electric focusing field so as to reduce any mass dependence of ion trajectories through the ion optical arrangement.

The varying frequency may be a cyclically varying frequency. The varying frequency may vary by at least 10%, preferably at least 20%.

The method of the invention may further comprise supplying a DC bias voltage to at least some electrodes and superimposing an AC voltage upon the DC bias voltage. The static electric field may comprise an axial DC field produced by a DC auxiliary voltage applied to auxiliary electrodes arranged in parallel with the multipole. The method may further comprise superimposing an AC voltage upon the DC auxiliary voltage to produce the superimposed varying electric field.

In another embodiment, the invention provides a method of operating an ion optical arrangement for use in a mass spectrometer, the ion optical arrangement comprising:
  electrodes defining an ion optical axis, and
  a voltage source for providing voltages to the electrodes to produce electric fields,
wherein the ion optical arrangement is configured for producing a static electric field, and
wherein the method comprises superimposing a varying electric field upon the static electric field so as to reduce any mass dependence of ion trajectories through the ion optical arrangement.

Embodiments of the method according to the invention may comprise determining the number of oscillations of an ion beam passing through the ion optical arrangement over the length of the ion optical arrangement, and varying the frequency of the radio frequency electric focusing field and/or setting the frequency of the varying electric field superimposed upon the static electric field such that the number of oscillations is changed by at least one. By determining the number of oscillations in the beam, it is possible to accurately determine the minimum required percentage of frequency change. The number of oscillations may be determined by conventional methods, for example visually.

It is noted that the ion optical axis along which ions pass through the ion optical arrangement may be straight but that this is not essential. In some embodiments, the ion optical axis through the collision cell is straight but the path of the ions through the ion optical arrangement may not be straight and may be partially or entirely curved, as in the arrangement of GB 2 546 060, for example.

The ion optical arrangement according to the invention may further comprise a pump for pressurizing the ion optical arrangement at least during the first operation mode in which it is used as a collision cell and a pressure release mechanism for releasing gas pressure when switching from the first operation mode to the second operation mode. The pressurizing pump may be switched off in the second operation mode. In some embodiments, the pump may be reversed in the second operation mode. In an embodiment, the ion optical arrangement may comprise a switchable pumping cross section in the collision cell housing for establishing a higher gas pressure inside the first operation mode (low cross section) and pumping the collision cell efficiently in the second operation mode (high cross section). The first operation mode may be a low energy mode while the second operation mode may be a high energy mode. That is, the ions passing through the collision cell may have a relatively low energy in the first operation mode when gas is present and a relatively high energy in the second operation mode, when virtually no gas is present.

Various pressure release mechanisms may be used. In an embodiment, the pressure release mechanism may comprise a valve operated by a Bourdon tube so as to pneumatically operate the pressure release mechanism. A Bourdon tube typically consists of a rounded or wound tube which straightens when inflated. In another embodiment, the pressure release mechanism may comprise a relay so as to electrically operate the mechanism. In some embodiments, a Bourdon tube and a relay may advantageously be combined.

In an embodiment, the pressure release mechanism comprises an electrostatic mechanism which also allows to electrically operate the mechanism. The electrostatic mechanism preferably comprises an insulating foil provided with a conducting layer, which insulating foil covers at least one opening in the collision cell when a first voltage is applied and is spaced apart from the at least one opening when a second voltage is applied. Thus, the insulating foil can be moved towards and away from openings in the housing of the collision cell by applying suitable voltages.

The present invention yet further comprises a software program product for carrying out the method described above, in particular for causing a processor to control the voltage source to produce suitable supply voltages to the electrodes. The software program product may comprise a tangible carrier on which instructions are stored which allow a processor to carry out steps of the method.

DETAILED DESCRIPTION OF PREFERRED EMBODIMENTS

As mentioned above, it is an object of the present invention to reduce the noding effect in an ion optical arrangement, such as a collision/reaction cell or a mass filter.

In GB 2 546 060, which is herewith incorporated by reference in this document, the concept of a pre-mass filtered collision cell interfaced to a multi-collector mass spectrometer is disclosed. An RF quadrupole pre-mass filter is used which also introduces noding effects similar to the RF collision cell. In the collision cell the ion beam trajectories are altered by the collisions and the strong phase correlation to the oscillating RF field of the ions traveling through the quadrupole is disturbed by the collisions and thus leads to less mass dependent transmission effects.

The small dependence of the trajectories depending on the mass is known as "noding". It is a result of the spatial oscillations of the ions inside a multipole. Depending on the number of oscillations of the ions, they leave the cell with an angle/position vector that is mass dependent. This effect can be amplified by the tuning parameters such as the potentials of the entry and exit lenses which determine the input and exit parameters of the ion beam entering and exiting the collision cell. The DC bias potential of the multipole rods also determines the travel velocity of the ions through the collision cell and has an influence on the noding.

By using higher order multipoles, from quadrupoles (4 poles) to hexapoles (6 poles) or octupoles (8 rods or poles), higher order oscillations are added to the ion trajectories which make the mass dependent differences of the trajectories less pronounced and which at the same time increase the acceptance input aperture of the collision cell. However, this beneficial effect is limited.

The pressurization of a collision cell by introducing a collision gas (e.g. helium) flow in the order of several ml/min results in multiple collisions of the ions with the collision gas, which in turn results in scattering and random movements of the ions. These scattering events further reduce the phase correlation of the ion beam trajectories to the oscillating RF field and thus reduce the noding effect. The more collisions the ions undergo the smaller the noding effect is. Especially for heavier ions multiple collisions result into both a reduction of the kinetic energy and a reduction of the energy spread of the ions, which improves the focusing conditions and which is known as collisional focusing.

The momentum transfer per collision becomes more efficient the more the difference in mass between both collision partners is reduced and might even stop the movement of the ions. For lighter masses approaching the low mass range of helium (He), the overall transmission efficiency through the pressurized collision cell is significantly reduced. This can partly be compensated by adding an axial electrical field gradient to the cell potential that actively drags ions from the entry to the exit aperture and therefore allows for an increased number of collisions as well as for higher transmission for lighter ions.

The noding effect can be reduced by using higher order multipoles with high gas pressures and axial fields, but it cannot be eliminated completely. Accurate and precise isotope ratio measurements using collision cells requires the availability of a calibrated standard and extensive calibration procedures. Tuning parameters need to be controlled carefully.

The present invention provides a solution to the noding problem by providing a collision/reaction cell that varies the number of oscillations the ions undergo in the RF field. That can be done by:

1. a variation of the RF frequency, and/or
2. a variation of the ions' energy/velocity in axial direction, and/or
3. any other lens element that influences the ion velocity.

Figure 4:
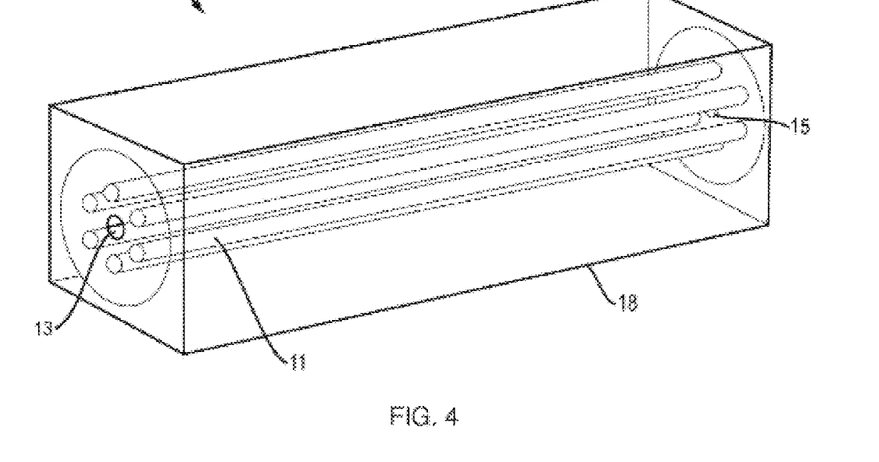
FIG. 4 schematically shows a multipole collision/reaction cell in which the invention may be utilized.

The variation of the axial energy can be achieved by, for example, superimposing an oscillation on the rod bias voltage (DC potential of the rods that defines the energy the ions have in the multipole) and/or by applying an oscillating voltage to the vanes (which may also be referred to as drag electrodes in some embodiments, see FIGS. 4A & 4B).

The amplitude of the applied variation is preferably such that the number of oscillations which the ions undergo changes by at least 1 over the length of the collision cell. As mentioned above, the number of oscillations n is given by the frequency and the velocity of an ion:

$$n = f \cdot l \cdot \sqrt{\frac{m}{2E}}$$

With:
f=frequency,
l=length of multipole,
m=ion mass, and
E=ion energy.

In an embodiment, the minimum number of oscillations is in the order of 10 (f=1 MHz, l=100 mm, m=7 amu and E=5 eV). Hence the frequency variation should preferably be at least 10 percent (it is noted that the number of oscillations n is directly proportional to f) or the energy variation should preferably be at least 20 percent.

Accordingly, the invention provides at least the following advantages:

- The use of RF frequency variations and/or superimposed frequencies reduces noding effects.
- There is only one optical axis in the system (no bypass optical axis). This allows a compact geometry and reduced aberrations.
- Since there is only one ion optical axis, the tuning of the system is much easier compared to a complicated deflection setup where the ion beam has to be steered along a bent bypass axis to circumvent the collision cell or vice versa.
- The principle of a segmented multipole lens also can be applied to a quadrupole mass filter lens. This allows the ion optical instrument to be switched from a low energy front-end RF multipole lens design to a high energy DC lens design without any noding effects.

Figure 1:
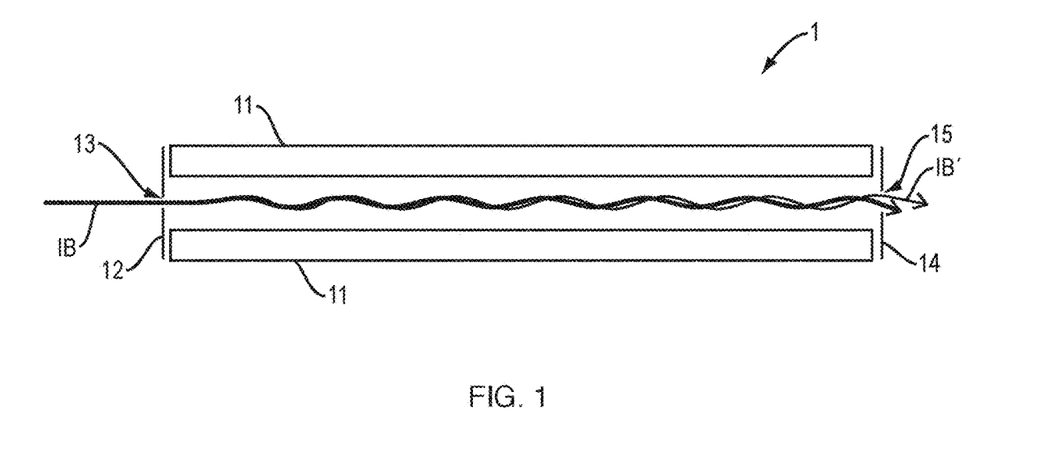
FIG. 1 schematically shows a multipole arrangement where noding occurs.

As mentioned above, a problem that may arise in a multipole arrangement is noding. This effect is illustrated in FIG. 1. A multipole arrangement, which may be part of a collision cell 1 or of a mass filter, comprises rods or poles 11, to which an RF voltage may be applied. An entrance electrode (front plate) 12 is provided with an entrance opening 13 for letting an ion beam IB enter the multipole arrangement. An exit electrode (back plate) 14 is provided with an exit opening 15 for letting the (modified) ion beam IB' exit the multipole arrangement.

As can be seen, some ions follow slightly different trajectories, resulting in the modified ion beam IB'. While the original ion beam IB was substantially uniform, the ion beam IB' exiting the multipole arrangement is no longer uniform, different ions exiting at slightly different angles. The trajectories shown in FIG. 1 are of ions having the same energy but different masses. Since different masses follow different trajectories, the probability that ions pass through the exit opening 15 (instead of hitting the end plate 14) is also mass dependent. In addition, the focusing of the ions emerging from the multipole arrangement in a subsequent ion optical device (such as a mass analyzer) may also become mass dependent. It will be clear that this is undesirable. In embodiments of the invention, therefore, the RF frequency of the voltage supplied to the rods is varied. That is, the RF frequency is not kept constant but is changed over time. Frequency changes of at least 10% are preferred, although smaller frequency changes such as 5% may in some embodiment also be used, also depending on the length of the multipole arrangement. Frequency changes of 15% or 20% may, however, be more effective in some multipole arrangements. That is, at an RF frequency of 1 MHz, for example, the frequency is preferably made to vary at least from 0.90 MHz to 1.10 MHz (−10% and +10%). The resulting RF frequency may vary over time in various ways: sawtooth, square or sinusoidal, for example.

Instead of, or in addition to changing the RF frequency to reduce the noding effect, it is also possible to superimpose a (preferably RF) frequency upon any DC bias voltage that is supplied to the multipole arrangement, even when the DC bias voltage is zero.

Figure 2A:
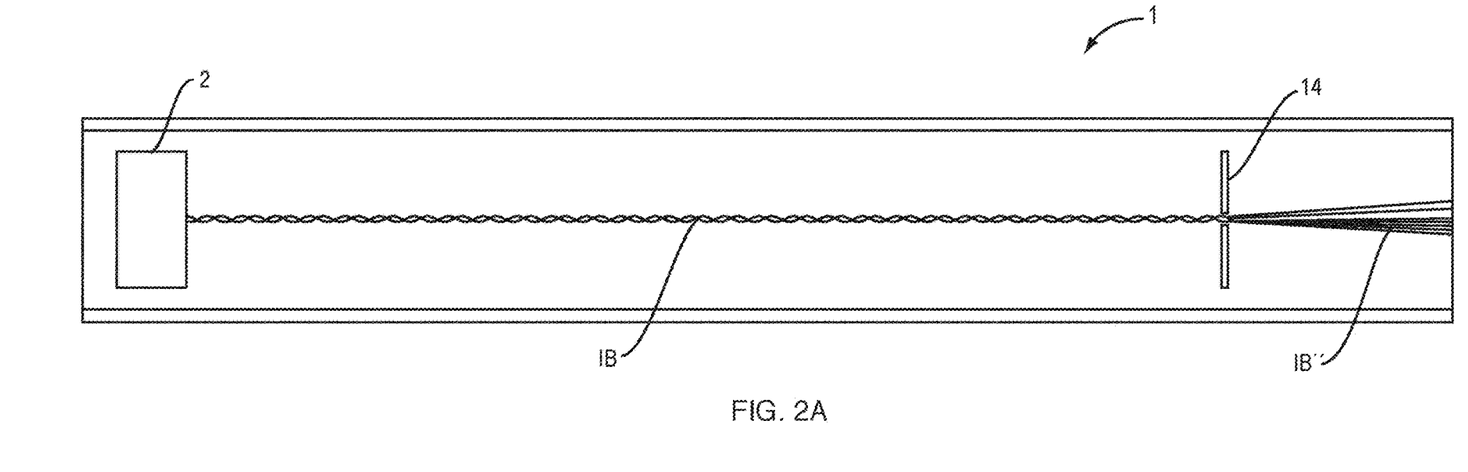
FIGS. 2A & 2B schematically show the noding effect in an ion optical arrangement.

FIG. 2A shows another example of noding. The ion beam IB, which is produced by an ion source 2 which in this embodiment is arranged inside an ion optical arrangement 1 having a wall 18, is shown to pass through an opening in an exit electrode 14. The ion beam IB shows many oscillations between the ion source 2 and the exit electrode 14. More importantly, the ion beam IB fans out after the exit electrode 14 to produce an ion beam fan IB". This is caused by noding: ions having different masses leave the exit electrode at different angles. In particular, the exit ion beam IB" is shown to consist of two parts: a top part containing a first type of ions (top first two lines) and a bottom part containing a second type of ions. Thus, the exit angle in mass dependent, which is undesirable.

Figure 2B:
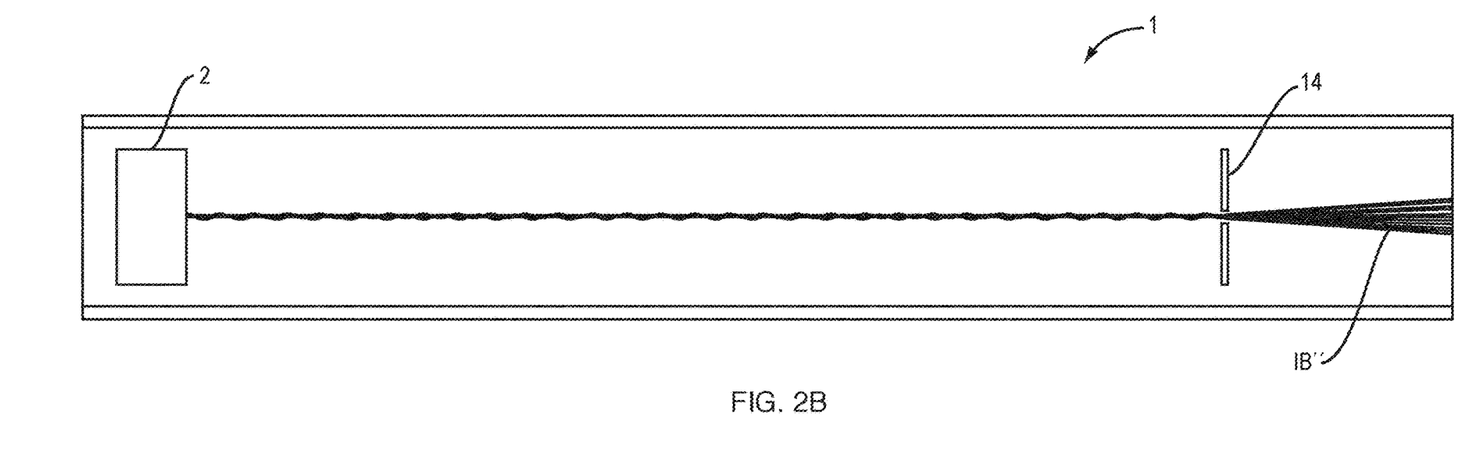

FIG. 2B shows an example where the noding effect is at least partially suppressed by using the present invention. The exit ion beam IB" still fans out but the exit angles are evenly distributed and are no longer ion specific, that is, mass dependent.

Figure 3A:
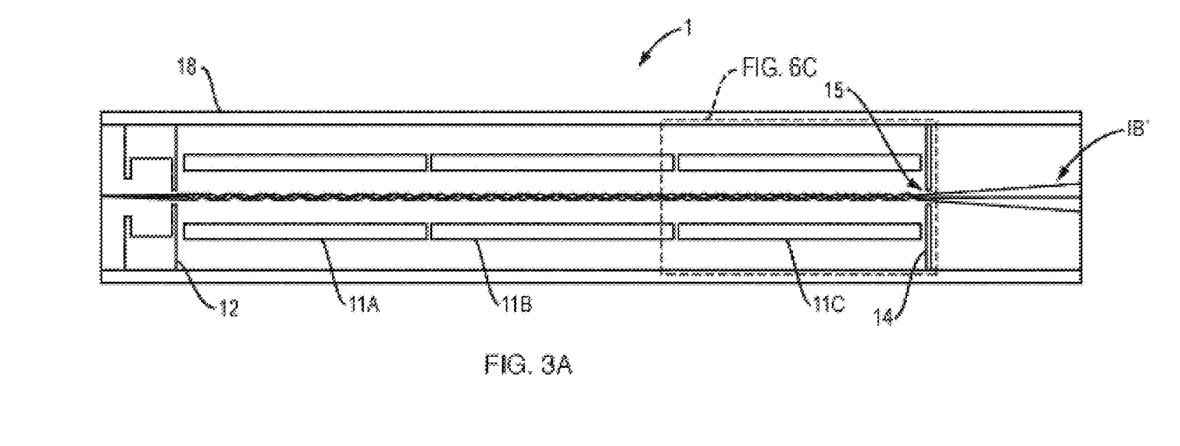
FIG. 3A schematically shows a partitioned multipole arrangement used in RF mode.

FIG. 3A schematically shows a multipole arrangement of a collision cell 1 according to the invention in a first operation mode, in which the rods are used as an RF multipole. The collision cell 1 is shown to have a housing 18, in which the multipole arrangement is accommodated. The collision cell 1 is further shown to comprise an entrance electrode 12 and an exit electrode 14, which comprises an exit opening 15. All three segments 11A, 11B & 11C of each rod have the same DC voltage in this first or RF operation mode, as in FIG. 3A. This DC voltage may or may not be equal to zero (ground).

Figure 3B:
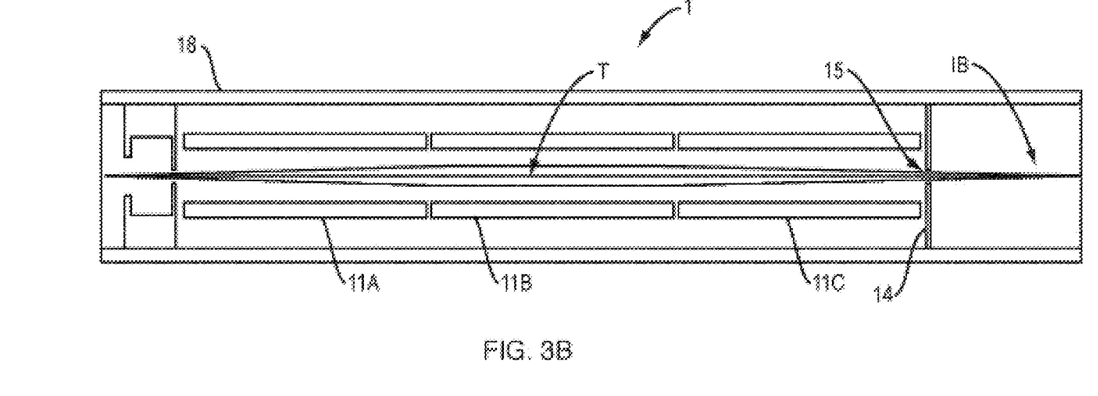
FIG. 3B schematically shows the partitioned multipole arrangement of FIG. 3A used in DC mode.
Figure 3C:
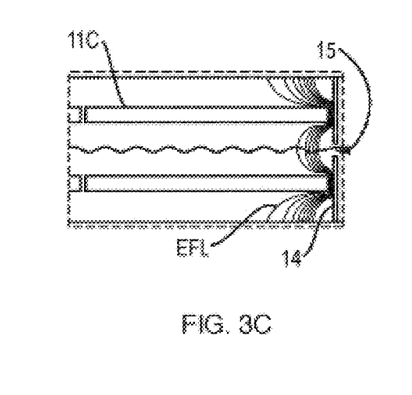
FIG. 3C schematically shows the electric field near the ends of the poles of FIG. 3A.

In the partially expanded FIG. 3C it can be seen that the ions do not follow straight lines but have oscillating trajectories. It can also be seen that the ions fan out evenly at the exit opening 15. This is the suppressed noding effect that may occur in the RF operation mode and which will later be discussed in more detail. The electrical field lines EFL are also schematically shown in FIG. 3C.

FIG. 3B schematically shows the same multipole arrangement as in FIG. 3A, but where different DC voltages are applied to each of the sections of the rods, so as to provide an einzel lens. An RF voltage is not applied in FIG. 3B. The trajectories of the ions (three different trajectories T are shown) depend on the entrance angles but no longer on the substantially random parameters as in the RF operation mode shown in FIG. 6A. The DC voltages that may be used are, for example, between −1 kV and −2 kV at a beam energy of 2 keV (high energy). It can be seen that the einzel lens causes ions having different trajectories to pass through the exit opening 15. The einzel lens can therefore be said to focus the ions in the second or DC operation mode, in which the ions may have a high energy.

It is noted that according to an additional aspect of the invention, the collision cell may be heated to reduce so-called memory effects. That is, by heating the collision cell to a temperature of, for example, 50° C., stray ions are less likely to remain on the electrodes (rods and/or vanes) and on the inner walls of the collision cell. It will be understood that stray ions which remain behind in an experiment may detrimentally influence any further experiment. A suitable temperature range is 40° C. to 70° C., preferably 45° C. to 55° C. Heating a collision cell is preferably achieved using electric heating.

As mentioned above, a further additional aspect of the invention is operating a collision cell in a pressurized mode and in an evacuated (that is, non-pressurized) mode. This requires that the collision cell can be pressurized and depressurized rapidly. In particular, a pressure release mechanism is desired that is fast and effective.

FIG. 4 schematically shows a collision cell in which the invention may be applied. The collision cell 1 is shown to comprise a housing 18 in which a multipole arrangement is accommodated. In the example shown, the multipole arrangement is a hexapole arrangement comprising six elongate poles or rods 11 which constitute electrodes. A radio frequency (RF) voltage may be fed to opposite pairs of poles 11 to produce an RF electric field. Ions can enter the collision cell through an entrance aperture 13 and leave the collision cell through an exit aperture 15. The RF field produced by the multipole arrangement focuses the ions on the longitudinal axis of the arrangement. This is particularly relevant when a collision gas is present in the collision cell, as collisions may cause the ions to deviate from their path.

According to an aspect of the invention, therefore, valve mechanisms are provided which are particularly suitable for use in a collision cell having a pressurized and an evacuated operation mode, such as, but not limited to, the collision cell of the present invention.

Figure 5A:
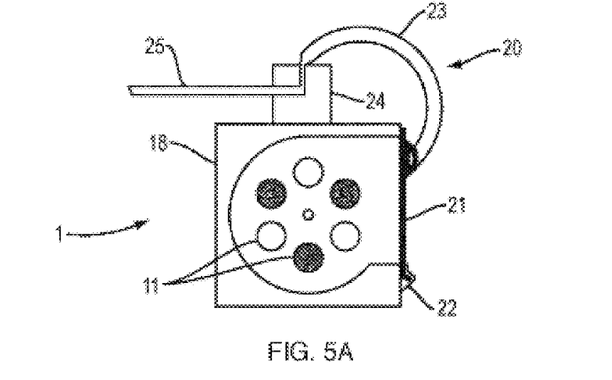
FIGS. 5A & 5B schematically show an embodiment of a pneumatic pressure release mechanism which may be used with the collision/reaction cell of FIG. 4.
Figure 5B:
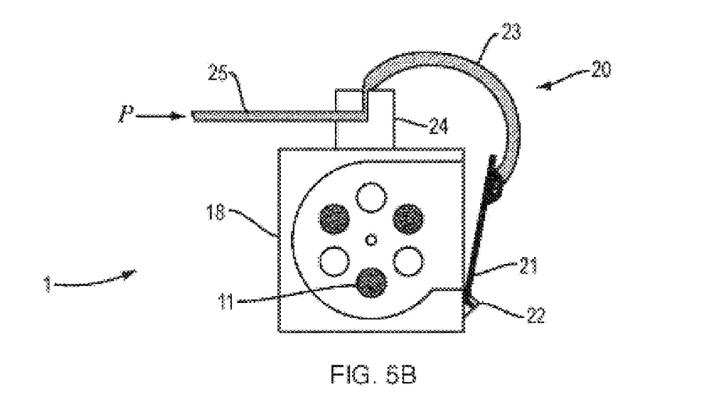

FIGS. 5A & 5B show a mechanism 20 for adjusting the pumping cross section of a collision cell housing 18 having rods 11. The mechanism 20 is shown to comprise a door or flap 21 which is connected via a hinge 22 to the housing 18 of the collision cell 1. The flap 21 can be operated by an actuator 23 of which one end is connected to the flap 21 and the other end is connected to a support element 24 attached to the housing 18.

The actuator 23 shown in FIGS. 5A & 5B is a Bourdon tube. A Bourdon tube comprises a bent tube. The bending radius of the bent tube can be decreased if the pressure difference between the inner part and the outer part of tube increases. To this end, a gas tube 25, which is also connected to the support element 24, is connected with the actuator 23. In the embodiment shown, the gas flows from the gas tube 25 through a channel in the support element 24 into the actuator 23 when the gas pressure in the gas tube 25 is higher than the gas pressure surrounding the actuator 23. By letting gas flow into the actuator, its bending radius decreases (the actuator straightens) and the flap is opened. Conversely, the gas flows from the actuator 23 through the support element 24 into the gas tube 25 when the gas pressure in the gas tube 25 is lower than in the actuator 23. By letting gas flow out of the actuator, its bending radius increases (the actuator curves) and the flap is closed.

Thus, by providing a pressure difference between the gas tube 25 and the air (or other gas) outside the actuator 23, the flap can be quickly opened or closed, thus allowing the gas pressure in the interior of the collision cell 1 to quickly assume the gas pressure on its outside.

It is noted that the collision cell 1 may be accommodated in a near-vacuum environment, while the gas tube may be connected with an environment under atmospheric pressure. The gas used for inflating the inflatable actuator may be air. As the interior volume of the actuator 23 and the gas tube 25 may be small, only a small amount of air or other gas is needed to inflate the actuator. This air or other gas may be provided by a gas reservoir or by a pump. Thus, a small pump or valve can be sufficient to indirectly operate the relatively large flap.

By using a Bourdon tube or similar actuator, a fast and effective pressure regulation of a collision cell can be achieved. However, a Bourdon tube is not the only type of actuator that may be used in a collision cell or similar pressurized chamber, as will be further explained with reference to FIG. 9.

Figure 6A:
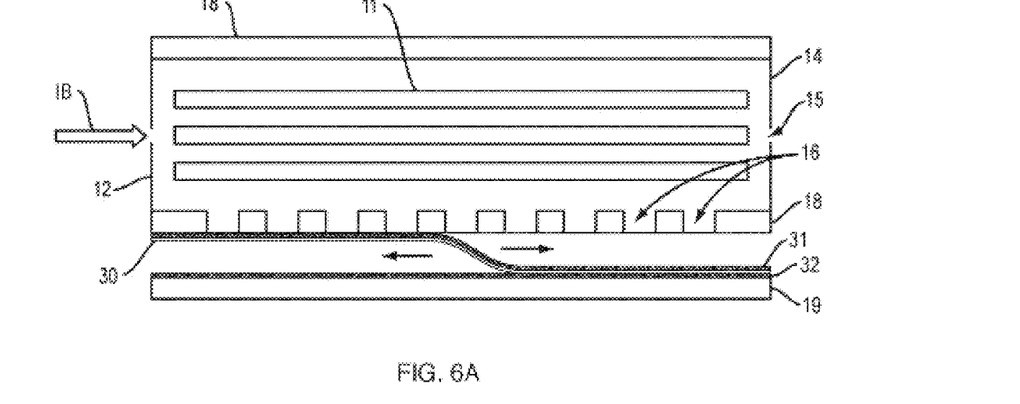
FIGS. 6A-6C schematically show an embodiment of an electrostatic pressure release mechanism which may be used with the collision/reaction cell of FIG. 4.

FIG. 6A schematically shows an electrostatic opening mechanism used in a collision cell. The collision cell 1 is shown to comprise a housing 18 in which rods 11 are accommodated. An ion beam IB can pass through the collision cell 1, through openings in the front plate 12 and back plate 14 respectively. In the embodiment shown, part of the wall of the housing 18 is provided with through holes 16 which can be closed off by a movable foil. This foil is located in a spacing between the housing 18 and a plate 19. Both the housing 18 and the plate 19 contain electrically conductive material and may both be made of metal, or at least contain a metal layer or other conductive layer. The plate 19, which extends substantially parallel to the housing 18, may be flat but may alternatively be curved to accommodate any curvature of the housing 18.

In the embodiment shown, the foil comprises two layers: a conductive layer 30 and an electrically insulating layer 31. A further electrically insulating layer 32 is attached to the plate 19. In an alternative embodiment, the foil consists of three layers: the conductive layer 30 and both insulating layers 31 & 32. Further layers may be added, as long as the foil remains sufficiently flexible. A suitable material for the insulating layers 31 & 32 is Kapton, but other materials, for example other polyimides, may also be used. The conductive layer may be made of copper foil, for example.

As mentioned above, the flexible foil is located in the spacing between the housing 18 and the plate 19. One edge of the foil may be attached to the housing 18 while the opposite edge may be attached to the plate 19, such that the foil bridges the spacing. By applying DC voltages to the conductive layer, the position of the foils can be changed, as shown in FIG. 9A by the arrows which indicate the possible movement of the substantially S-shaped spacing-bridging portion of the foil.

Figure 6B:
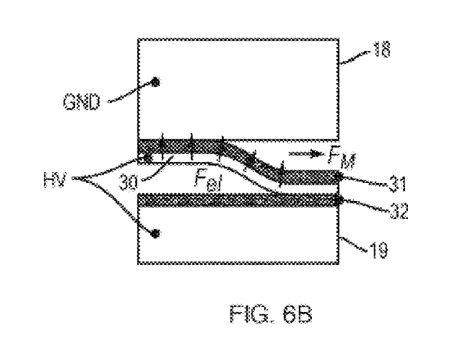

Referring to FIG. 6B, the housing 18 will typically be connected to ground (GND). The conductive plate 19 can be connected to a high voltage, indicated by HV in FIG. 9B, thus creating a voltage difference over the spacing between the housing 18 and the plate 19. If the conductive layer 30 is connected to a high voltage, then the foil will be repelled by the plate 19 and attracted by the housing 18. As a consequence, the foil will tend to move towards the housing and the S-shaped spacing bridging part will move to the right (see also FIG. 9A). In other words, electrical forces $F_{el}$ pulling the foil towards the housing cause a mechanical force $F_m$ to the right in FIG. 9B. The foil will cover the through holes 16 and the interior of the collision cell will be closed off.

Figure 6C:
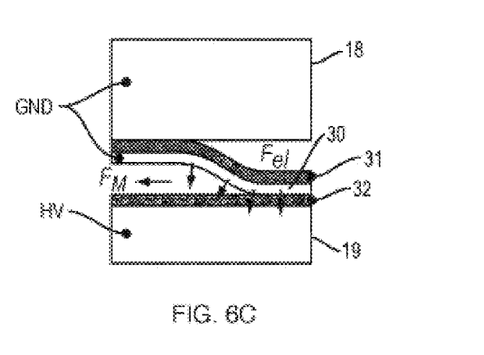

Referring to FIG. 6C, the through holes 16 can be opened by connecting the conductive layer 30 to ground instead of to the high voltage (HV). This will cause the foil to be repelled by the housing 18 and to be attracted by the plate 19, which in turn cause the S-shaped spacing bridging part to move to the left (see also FIG. 9A). In other words, electrical forces $F_{el}$ pulling the foil towards the plate 19 cause a mechanical force $F_m$ to the left in FIG. 9C. The foil will no longer cover the through holes 16 and the interior of the collision cell will be open to the surrounding atmosphere.

As the movement of the foil is controlled by voltages, which can be switched extremely quickly, and as the foil can have a very low mass, the movement of the foil can be very quick. Accordingly, the pressure inside the collision cell 1 can be adjusted very rapidly and switching between a pressurized state and an evacuated state can be carried out almost instantly.

Figure 7:
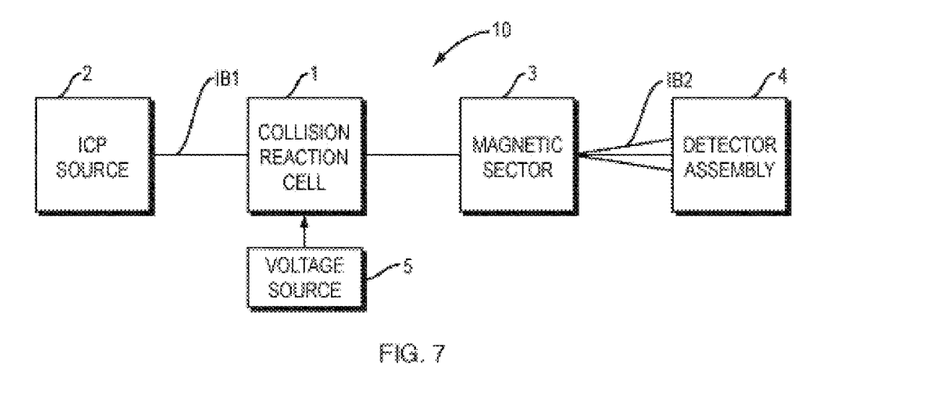
FIG. 7 schematically shows a mass spectrometer comprising an ion optical arrangement in accordance with the invention.

The exemplary mass spectrometer 10 schematically shown in FIG. 7 comprises a collision cell 1, which can be a collision cell as described above. The mass spectrometer 10 may further comprise a plasma source 1, such as an ICP (inductively coupled plasma) source for generating an ion beam IB1. The mass spectrometer may further comprise a mass filter 3, such as a magnetic sector mass filter. In the magnetic sector mass filter, the ion beam IB1 is separated into partial beams IB2 having different m/z (mass versus charge) ratios, which partial beams can be detected by the detector assembly 4, which may be a multiple detector assembly. The mass spectrometer 10 may further comprise a pump for lowering the gas pressure in the collision cell 1, a valve associated with the pump, a voltage source 5 for supplying DC and AC (RF) voltages to the collision cell 1, and a controller for controlling the various components of the mass spectrometer 10. The valve may comprise a foil-based valve and/or a Bourdon tube-based valve as described above.

Aspects of the invention comprise:
a) A multipole collision cell with variation of the number of oscillations in RF mode in order to average mass dependent trajectories and thus to counter the noding effect.
b) A multipole collision cell in which an AC voltage is superimposed upon a DC voltage, such as a multipole bias voltage, so as to counter the noding effect.
c) A multipole collision cell which can rapidly switched between a first operation mode, in which the collision gas at least partly mitigates the noding effect, and a second operation mode in which no collision gas is used but which allows higher ion energies.

d) Mechanisms for allowing a rapid switch between the first operation mode and the second operation mode.

These aspects of the invention may be used in isolation or in combination.

Although the invention has been described above mainly with reference to a collision cell or a collision/reaction cell, the invention is not so limited and may also be utilized in other ion optic arrangements, such as mass filters and/or ion optic lens systems.

It will be understood by those skilled in the art that the invention is not limited to the embodiments shown and that many additions and/or modifications can be made without departing from the scope of the invention as defined in the appending claims.

The invention claimed is:

1. An ion optical arrangement for use in a mass spectrometer comprising:
   electrodes comprising a multipole arrangement defining an ion optical axis, and
   a voltage source for providing voltages to the electrodes to produce electric fields,
   wherein the ion optical arrangement is configured for producing a radio frequency electric focusing field for focusing ions on the ion optical axis,
   wherein the ion optical arrangement is further configured for producing a static electric field, and
   wherein a varying electric field is superimposed upon the static electric field so as to reduce any mass dependence of ion trajectories through the ion optical arrangement,
   wherein the static electric field comprises an axial DC field produced by a DC auxiliary voltage applied to auxiliary electrodes arranged in parallel with the multipole, and wherein the superimposed varying electric field is produced by superimposing an AC voltage upon the DC auxiliary voltage.

2. The ion optical arrangement according to claim 1, wherein the static electric field comprises a field produced by a DC bias voltage applied to the multipole arrangement, and wherein the superimposed varying electric field is produced by superimposing an AC voltage upon the DC bias voltage.

3. The ion optical arrangement according to claim 2, wherein the DC bias voltage is equal to zero.

4. The ion optical arrangement according to claim 1, wherein at least one auxiliary electrode comprises a series arrangement of resistors for providing a voltage gradient in the auxiliary electrode so as to produce an axial field gradient.

5. The ion optical arrangement according to claim 1, wherein the ion optical arrangement comprises a mass filter.

6. The ion optical arrangement according to claim 1, wherein the ion optical arrangement comprises a collision/reaction cell.

7. A mass spectrometer comprising an ion optical arrangement according to claim 1.

8. An ion optical arrangement for use in a mass spectrometer comprising:
   electrodes defining an ion optical axis, and
   a voltage source for providing voltages to the electrodes to produce electric fields,
   wherein the ion optical arrangement is configured for producing a static electric field, and
   wherein a varying electric field is superimposed upon the static electric field so as to reduce any mass dependence of ion trajectories through the ion optical arrangement,
   wherein the static electric field comprises an axial DC field and the voltage source is configured to provide a DC auxiliary voltage applied to an ion optical lens to produce the axial DC field, and
   wherein the superimposed varying electric field is produced by superimposing an AC voltage upon the DC auxiliary voltage.

9. The ion optical arrangement according to claim 8 wherein the axial electric field has an axial field gradient.

10. A method of operating an ion optical arrangement for use in a mass spectrometer, the ion optical arrangement comprising:
    electrodes comprising a multipole arrangement defining an ion optical axis, and
    a voltage source for providing voltages to the electrodes to produce electric fields,
    wherein the ion optical arrangement is configured for producing a radio frequency electric focusing field for focusing ions on the ion optical axis,
    wherein the ion optical arrangement is further configured for producing a static electric field,
    the method comprising superimposing a varying electric field upon the static electric field so as to reduce any mass dependence of ion trajectories through the ion optical arrangement,
    wherein the static electric field comprises an axial DC field produced by a DC auxiliary voltage applied to auxiliary electrodes arranged in parallel with the multipole, and wherein the method comprises superimposing an AC voltage upon the DC auxiliary voltage to produce the superimposed varying electric field.

11. The method according to claim 10, further comprising supplying a DC bias voltage to at least some electrodes and superimposing an AC voltage upon the DC bias voltage.

12. A software program product for carrying out the method according to claim 10.

* * * * *

UNITED STATES PATENT AND TRADEMARK OFFICE
CERTIFICATE OF CORRECTION

PATENT NO. : 12,087,567 B2
APPLICATION NO. : 18/339510
DATED : September 10, 2024
INVENTOR(S) : Henning Wehrs et al.

It is certified that error appears in the above-identified patent and that said Letters Patent is hereby corrected as shown below:

In the Claims

In Column 13, Claim 1, Line 27, delete "and" and insert the same at Line 30, after "arrangement," as a continuation sub-point.

In Column 14, Claim 9, Line 22, delete "claim 8" and insert -- claim 8, --, therefor.

Signed and Sealed this
Twelfth Day of November, 2024

Katherine Kelly Vidal
*Director of the United States Patent and Trademark Office*